United States Patent
Nakada

(10) Patent No.: US 7,021,112 B2
(45) Date of Patent: Apr. 4, 2006

(54) MANUFACTURING METHOD FOR METAL DESIGN PANEL

(75) Inventor: Yasuhiro Nakada, Hamamatsu (JP)

(73) Assignee: Yamaha Corporation, (JP)

( * ) Notice: Subject to any disclaimer, the term of this patent is extended or adjusted under 35 U.S.C. 154(b) by 162 days.

(21) Appl. No.: 10/650,826

(22) Filed: Aug. 29, 2003

(65) Prior Publication Data

US 2004/0104509 A1    Jun. 3, 2004

(30) Foreign Application Priority Data

Sep. 2, 2002    (JP)    ............... 2002-256719

(51) Int. Cl.
*B21D 31/00*    (2006.01)

(52) U.S. Cl. ........................ 72/379.2; 72/333

(58) Field of Classification Search ............... 72/333, 72/379.2; 29/527.4; 264/135, 241, 250, 264/254, 255, 259, 263, 265, 266, 294; 428/545, 428/195.1, 209, 457
See application file for complete search history.

(56) References Cited

U.S. PATENT DOCUMENTS

| | | | |
|---|---|---|---|
| 5,531,950 A * | 7/1996 | Kimura et al. | 264/135 |
| 6,768,654 B1 * | 7/2004 | Arnold et al. | 361/818 |
| 6,818,305 B1 * | 11/2004 | Murar et al. | 428/412 |
| 6,841,107 B1 * | 1/2005 | Peters et al. | 264/135 |
| 6,887,413 B1 * | 5/2005 | Schumacher | 264/135 |

FOREIGN PATENT DOCUMENTS

| | | |
|---|---|---|
| DE | 6801992 | 9/1968 |
| DE | 1 904 625 | 10/1969 |
| DE | 38 39 855 | 10/1990 |
| DE | 198 42 725 A1 | 3/2000 |
| DE | 100 29 450 | 1/2002 |
| FR | 1503392 | 12/1966 |
| FR | 2 816 543 | 11/2000 |
| JP | 2001-009862 | 1/2001 |
| JP | 2001-225346 | 8/2001 |
| JP | 2001-225352 | 8/2001 |
| WO | WO 99/59793 | 11/1999 |

OTHER PUBLICATIONS

German Examination Report mailed Apr. 15, 2004.
Statement confirming revelant portions of each document.

* cited by examiner

*Primary Examiner*—Ed Tolan
(74) *Attorney, Agent, or Firm*—Dickstein, Shapiro, Morin & Oshinsky, LLP.

(57) ABSTRACT

A metal design panel is constituted by a surface decorative member and a thermoplastic resin member, which are firmly and integrally combined together. A plurality of through holes or dimples are formed at prescribed positions of a metal plate panel, which serves as a surface decorative member, in conformity with an outline of a product completed in manufacture. The metal plate panel is subjected to trimming to remove an unwanted peripheral portion, thus extracting a metal plate therefrom. The metal plate is arranged in a metal mold, into which a melted thermoplastic resin is injected to form a resin layer, which is firmly combined with the metal plate. Alternatively, a core member is formed and extracted from the metal plate panel and is combined with a resin layer upon injection molding.

7 Claims, 13 Drawing Sheets

FIG. 8
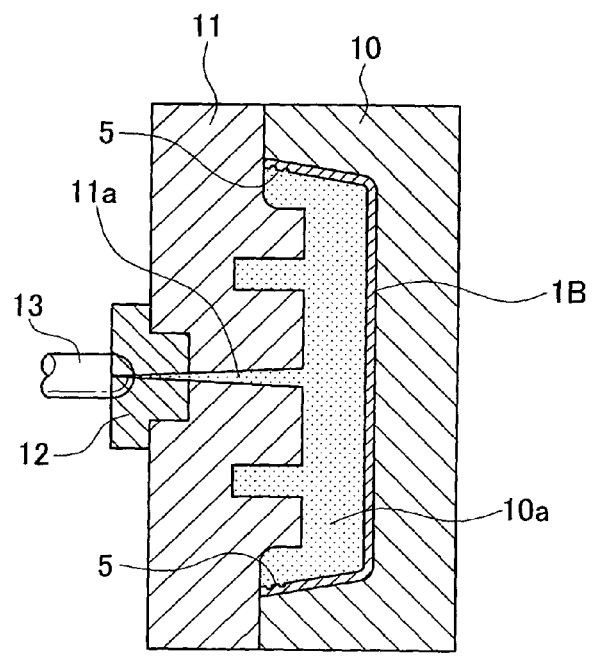
FIG. 9A  FIG. 9B  FIG. 9C
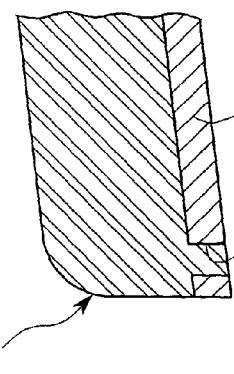 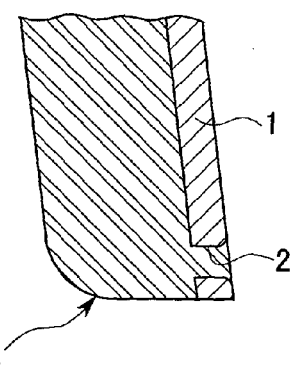 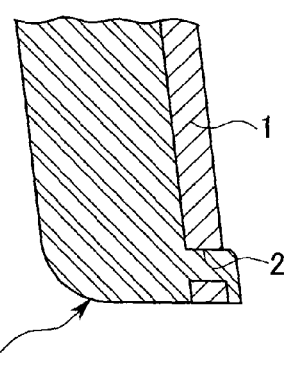

MANUFACTURING METHOD FOR METAL DESIGN PANEL

BACKGROUND OF THE INVENTION

1. Field of the Invention

This invention relates to manufacturing methods for metal design panels made by complex molding using surface decorative metal members and thermoplastic resins.

2. Description of the Related Art

Metal design panels are manufactured by processing metal plate panels serving as surface decorative members, and they have been adapted to a variety of fields such as faceplates, nameplates, building materials for interiors and exteriors, and automobile decorating members for interiors and exteriors. A first example of a conventionally-known manufacturing method of a metal design panel will be described with reference to FIGS. 15A to 15C.

In a first step, there is provided in advance a solid member 100 shown in FIG. 15A, which is made by integral formation using a thermoplastic resin. A curved hollow 101 is formed on the surface of the solid member 100; and legs 102 are formed in the backside of the solid member 100. In a second step, there is provided a metal plate panel 103 serving as a surface decorative member, wherein the metal plate panel 103 is slightly bent in advance to match the curved hollow 101 and is then arranged on the surface of the solid member 100 by use of adhesive (see FIG. 15B). In a third step, ends of the metal plate panel 103, which are extended downwardly from both sides of the solid member 100, are bent upon press working so that both ends of the solid member 100 are covered with bent portions of the metal plate panel 103; thus, it is possible to completely produce a metal design panel as shown in FIG. 15C.

In a second example of the conventionally-known manufacturing method, the metal plate panel 103 is formed in advance in a prescribed shape as shown in FIG. 15C, wherein primer is coated onto the backside of the metal plate member 103 in order to improve adhesion, and then, the metal plate panel 103 is arranged in a metal mold of an injection molding machine (not shown); thereafter, insert molding for filling the metal mold with a thermoplastic resin is performed to form the solid member 100.

In the first example of the manufacturing method described above, it is necessary to perform preliminary formation of the metal plate panel 103 and press working for bending ends of the metal plate panel 103. In the second example of the manufacturing method, it is necessary to coat primer onto the backside of the metal plate panel 103, which does not rationalize or improve manufacturing.

Even though the metal design panel is produced by the aforementioned manufacturing method, a resin member and a surface decorative metal member (i.e., the solid member 101 and the metal plate panel 103) are easily separated from each other at contact areas therebetween due to differences of materials (i.e., metal and resin) therefor. It is well known that building materials for interiors and exteriors and/or automobile materials for interiors and exteriors are exposed to severe environmental conditions, subjecting them to relatively large temperature changes, and that metal and resin materials differ from each other in expansion coefficients. Therefore, even when adhesive or primer is applied, the surface decorative metal member and the resin member are easily separated from each other at contact areas therebetween. This causes a drawback in that the surface decorative metal member easily floats and moves relative to the resin member, causing abnormal sound (or noise) unexpectedly when vibrated.

SUMMARY OF THE INVENTION

It is an object of the invention to provide a manufacturing method for a metal design panel in which a thermoplastic resin is firmly and integrally combined together with a surface decorative metal member and which is therefore not deteriorated in quality under severe environmental conditions in which there are relatively large temperature changes.

A metal design panel is constituted by a surface decorative member and a thermoplastic resin member, which are firmly and integrally combined together. Herein, a plurality of through holes are formed at prescribed positions of a metal plate panel, which serves as a surface decorative member, in conformity with an outline of a product completed in manufacture. The metal plate panel is subjected to trimming to remove an unwanted peripheral portion, thus extracting a metal plate having the through holes from the metal plate panel. The metal plate is arranged in a metal mold, into which a melted thermoplastic resin is injected to form a resin layer, which is partially infiltrated into the through holes and which is therefore firmly combined with the metal plate.

In the above, it is possible to form a plurality of dimples, instead of the through holes, on the metal plate panel, so that a metal plate having the dimples is extracted from the metal plate panel by trimming.

In addition, it is possible to form a core member having through holes or dimples upon press working performed on the metal plate panel; then, the core member is isolated from the metal plate panel upon trimming. Furthermore, a holding member can be fixed to an interior wall of the core member. A melted thermoplastic resin is injected into the core member to form a resin layer, which is firmly combined with the core member.

The core member can be designed to have projecting elements, which are inwardly bent, thus further increasing the combining strength when combined with the resin layer.

Thus, it is possible to produce a metal design panel that is reliably guaranteed in quality without causing deterioration (e.g., aging) or problems even when exposed to severe environmental conditions having relatively large temperature changes.

BRIEF DESCRIPTION OF THE DRAWINGS

These and other objects, aspects, and embodiments of the present invention will be described in more detail with reference to the following drawings, in which:

FIG. 8 is a cross sectional view showing a metal mold in which the core member shown in FIG. 7C is held and into which a melted resin is injected to form the resin layer;

FIG. 9A is an enlarged cross sectional view showing essential parts of a metal design panel, produced by the first embodiment, in which a metal plate panel is firmly combined with a resin layer at a through hole;

FIG. 9B is an enlarged cross sectional view showing essential parts of the metal design panel in which undercutting is performed on an opening of the through hole to improve grip performance;

FIG. 9C is an enlarged cross sectional view showing essential parts of the metal design panel in which a part of the resin layer flowing into the through hole is changed in direction to flow along the surface of the metal plate panel so as to improve grip performance;

DESCRIPTION OF THE PREFERRED EMBODIMENTS

This invention will be described in further detail by way of examples with reference to the accompanying drawings.

Figure 1A:
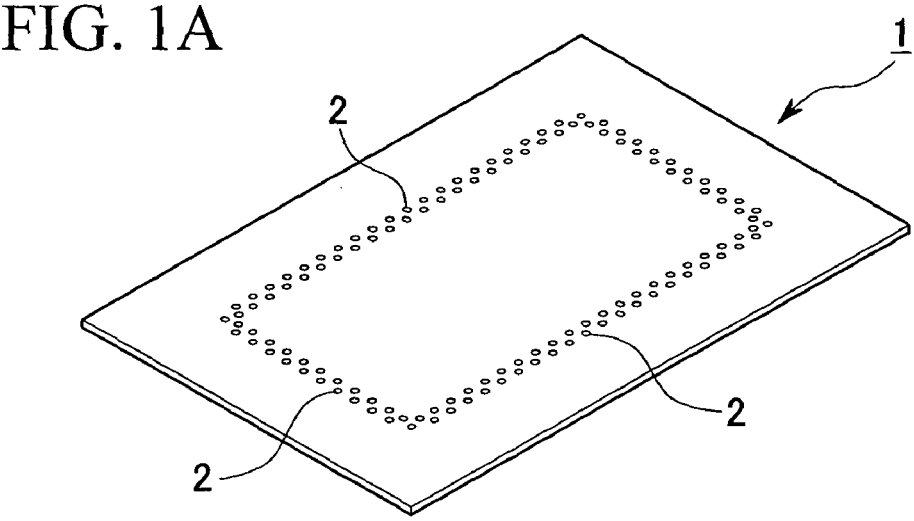
FIG. 1A is a perspective view showing a metal plate panel on which through holes are formed in accordance with a manufacturing method of a metal design panel according to a first embodiment of the invention.

A manufacturing method according to a first embodiment of the present invention will be described with reference to FIGS. 1A to 1C. Herein, reference numeral 1 designates a metal plate panel serving as a surface decorative member, the material of which is not necessarily limited to specific materials but is required to provide superior workability (or processability). Herein, it is possible to use a metal plate panel whose front side can be decorated (or not decorated) by printing, coating and/or the other decorating means, which can be performed in advance or after injection molding.

In a first step of the manufacturing method according to the first embodiment, appropriate processing such as punching and electric discharging are performed on the metal plate panel 1 (see FIG. 1A) so as to form a plurality of through holes 2 at prescribed positions in conformity with an outline of a product completed in manufacture. Each of the through holes 2 must have a prescribed size allowing a melted resin to flow therethrough.

Figure 1B:
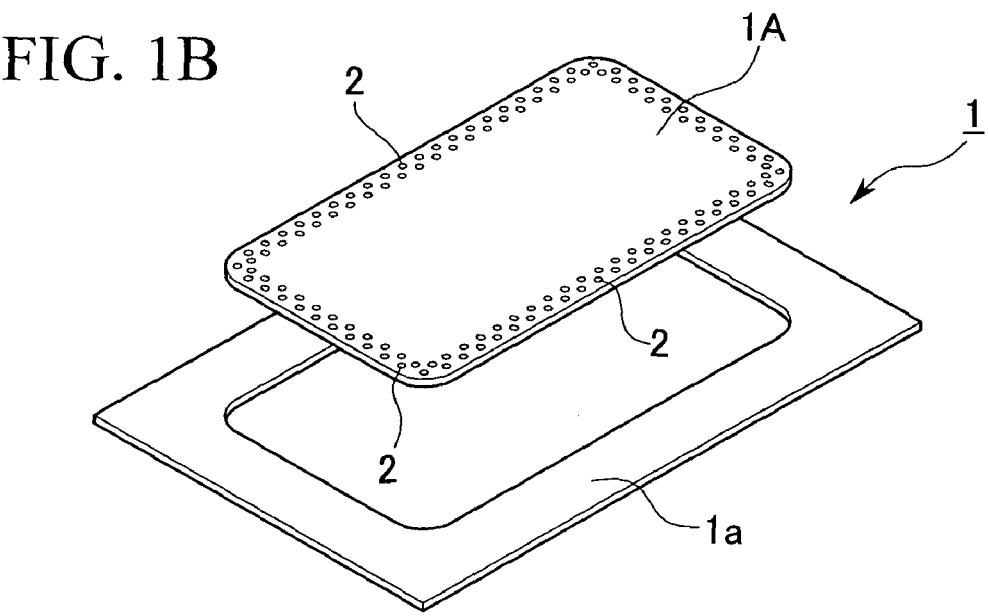
FIG. 1B is a perspective view in which a metal plate is separated from the rest of the metal plate panel shown in FIG. 1A.
Figure 2:
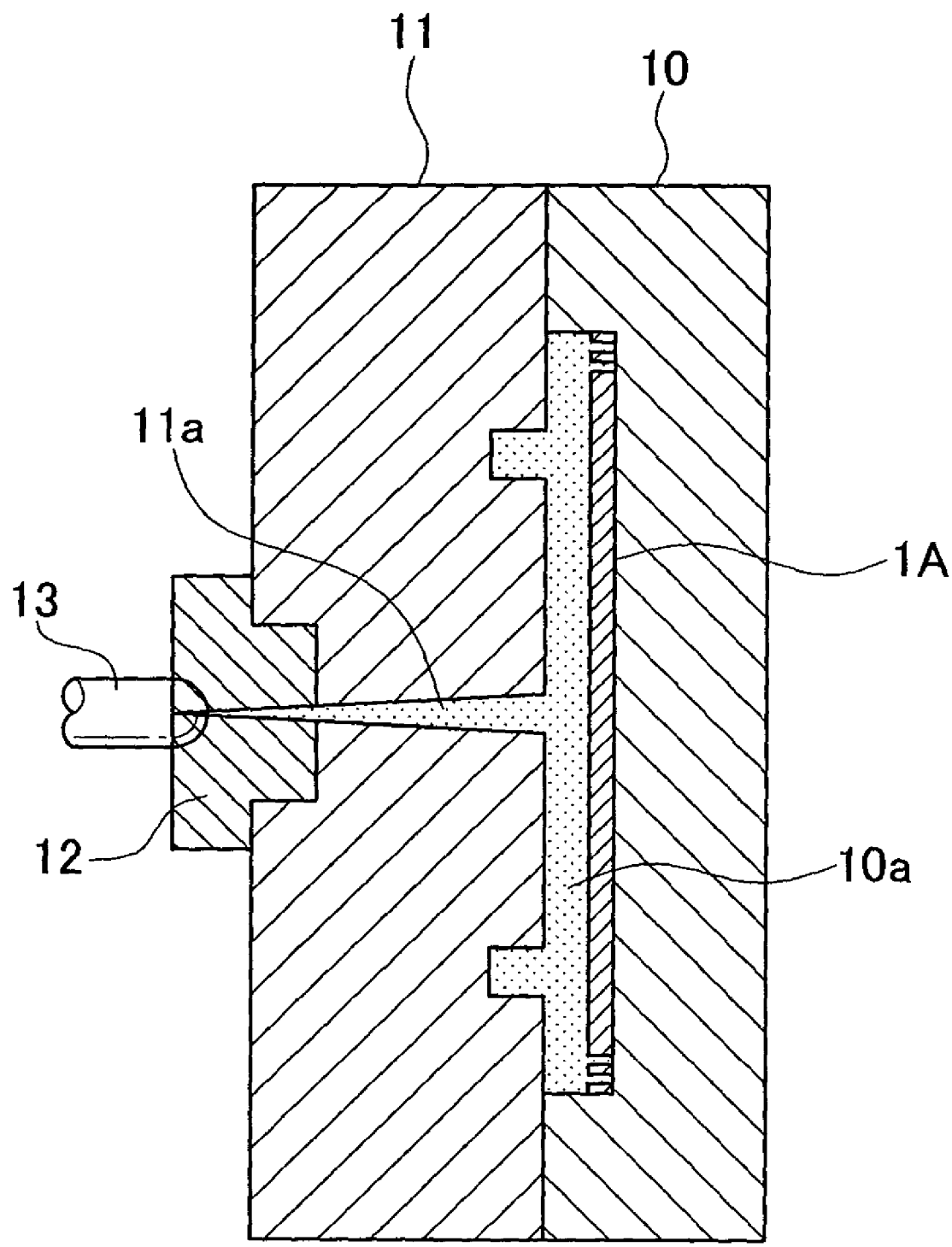
FIG. 2 is a cross sectional view showing a metal mold in which the metal plate shown in FIG. 1B is held and into which a melted resin is injected to form the resin layer.

Then, the metal plate panel 1 having the aforementioned through holes 2 is subjected to trimming so as to remove unwanted peripheral portion 1a as shown in FIG. 1B, thus extracting a metal plate 1A. The extracted metal plate 1A is arranged in a metal mold for use in injection molding (see FIG. 2) in which an injection molding machine is used to form a resin layer on the backside of the extracted metal plate 1A. In FIG. 2, reference numeral 10 designates a moving mold having a cavity 10a into which the extracted metal plate 1A is placed. Reference numeral 11 designates a fixed mold having a prescribed interior shape for forming exposed surfaces of a resin that is injected into the cavity 10a of the moving mold 10. The fixed mold 11 is equipped with a sprue bush 12, via which a melted resin injected from the an injection nozzle 13 is introduced into the cavity 10a by way of a sprue 11a.

Figure 1C:
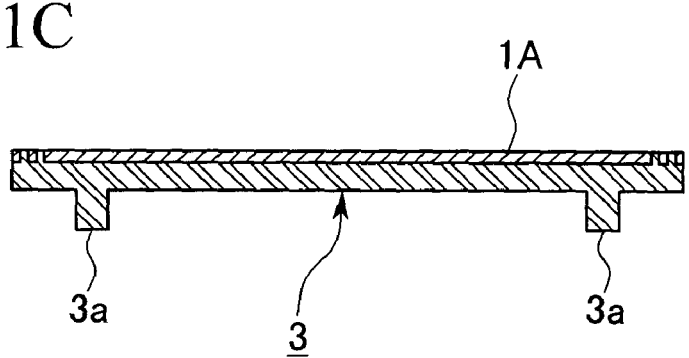
FIG. 1C is a cross sectional view showing a metal design panel in which the metal plate shown in FIG. 1B is firmly attached together with a resin layer.

When the melted resin is injected into the cavity 10a of the moving mold 10, it is hardened to form a resin layer 3 (see FIG. 1C). Herein, the melted resin is infiltrated into each of the through holes 2 and is then hardened therein; thus, it is possible to produce a metal design panel in which the metal plate 1A and the resin layer 3 are integrally combined together. Reference numerals 3a designate legs by which the metal design panel is attached to a wall surface or some apparatus as an interior member. As described above, the metal design panel produced in the first embodiment is characterized in that ends of the metal plate 1A are firmly and integrally combined together with the resin layer 3. Hence, the surface of the metal design panel can be subjected to baking and printing finish to form prescribed patterns thereon. Thus, it is possible to use the metal design panel as an exterior member and the like.

Figure 3A:
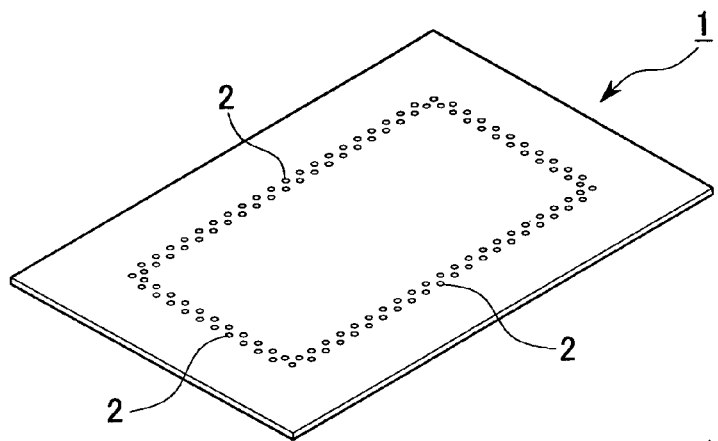
FIG. 3A is a perspective view showing a metal plate panel on which through holes are formed in accordance with a modified manufacturing method according to the first embodiment.
Figure 3B:
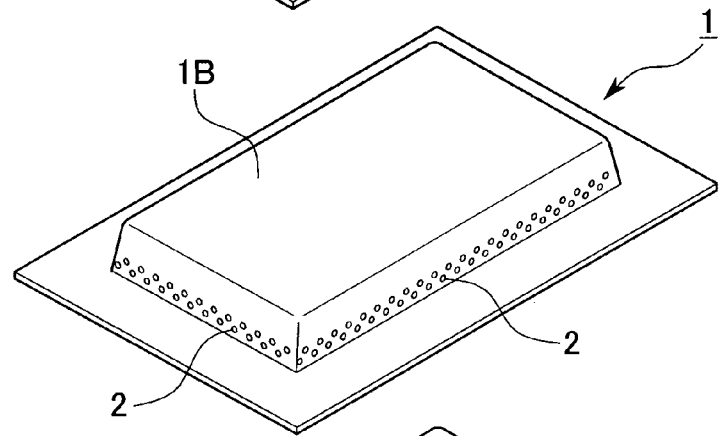
FIG. 3B is a perspective view showing a core member that is built up from the metal plate panel shown in FIG. 3A.
Figure 3C:
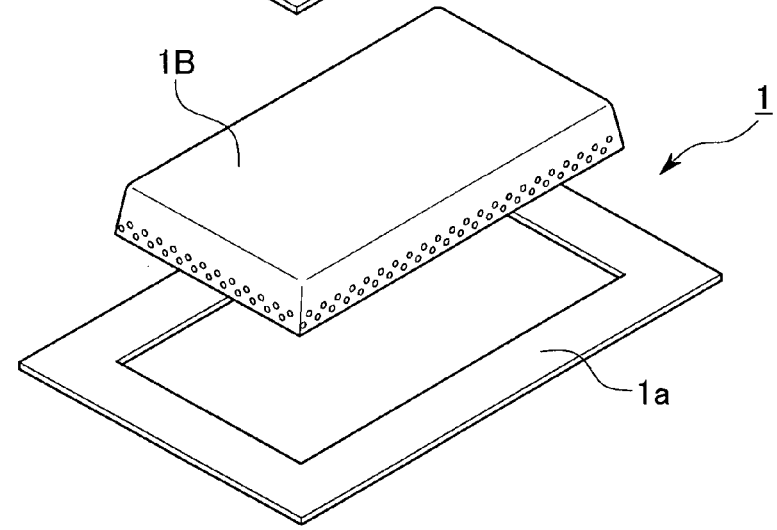
FIG. 3C is a perspective view in which the core member is isolated from the rest of the metal plate panel.

Next, a modified example of the first embodiment will be described with reference to FIGS. 3A to 3D. Herein, it is possible to use a metal plate panel whose front side can be decorated (or not decorated) by printing, coating and/or the other decorating means, which can be performed in advance or after injection molding. In a first step, appropriate processing such as punching and electric discharging is performed on the metal plate panel 1 so as to form a plurality of through holes 2 at prescribed positions in conformity with an outline of a product completed in a manufacture as shown in FIG. 3A. Then, the metal plate panel 1 of FIG. 3A is molded upon press working (with respect to the foregoing metal plate portion 1A) so as to form a core member 1B (see FIG. 3B), which is built up from the through holes 2. At this time, it is possible to simultaneously form irregular patterns (or irregularities) on the surface of the core member 1B. Then, the metal plate panel 1 shown in FIG. 3B is subjected to trimming to remove an unwanted peripheral portion 1a; thus, it is possible to isolate the core member 1B as shown in FIG. 3C. In the above, trimming is performed to remove the unwanted peripheral portion 1a after the metal plate panel 1 is molded upon press working; however, it is possible to change these steps in order. That is, the unwanted peripheral portion 1a is firstly removed from the metal plate panel 1, which is then molded upon press working, for example.

Figure 3D:
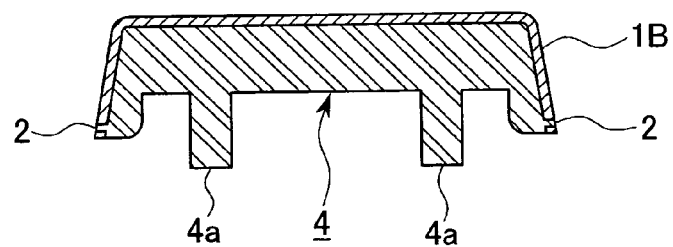
FIG. 3D is a cross sectional view showing a metal design panel in which the core member is firmly combined with a resin layer.
Figure 4:
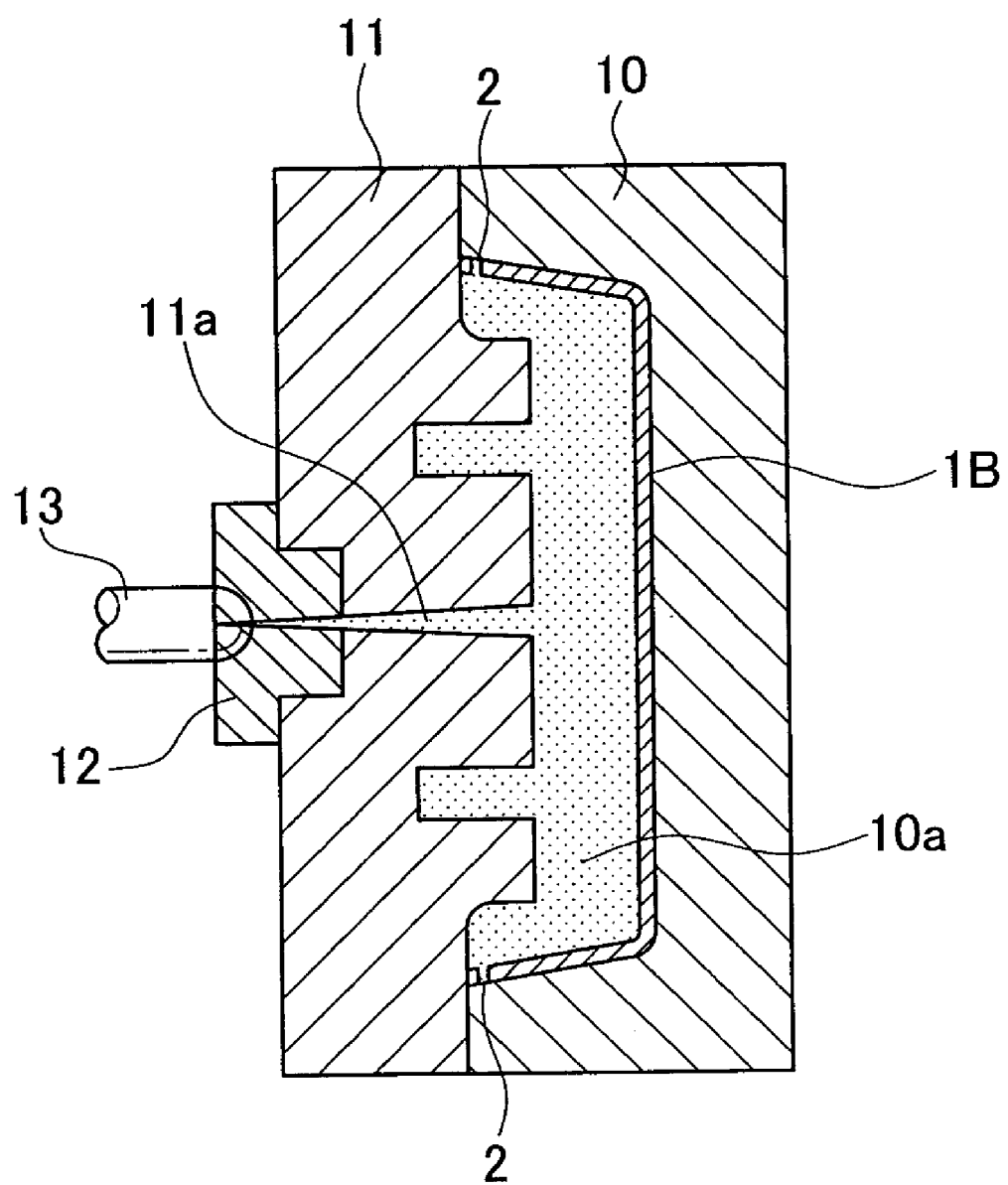
FIG. 4 is a cross sectional view showing a metal mold in which the core member shown in FIG. 3C is held and into which a melted resin is injected to form the resin layer.

The aforementioned core member 1B derived from the metal plate panel 1 is arranged in a metal mold for use in injection molding as shown in FIG. 4 in order to form a resin layer on the backside thereof by use of an injection molding machine. That is, similar to the foregoing first embodiment (see FIG. 2), a melted resin is injected into the metal mold and is then hardened to form a resin layer 4 firmly combined with the backside of the core member 1B as shown in FIG. 3D. In this case, the melted resin is infiltrated into the through holes 2 of the core member 1B and is hardened therein; therefore, it is possible to complete production of a metal design panel in which a surface decorative member is firmly and integrally combined with a resin layer. Such a metal design panel is attached to a wall surface or an apparatus by use of legs 4b as an interior material.

Figure 5A:
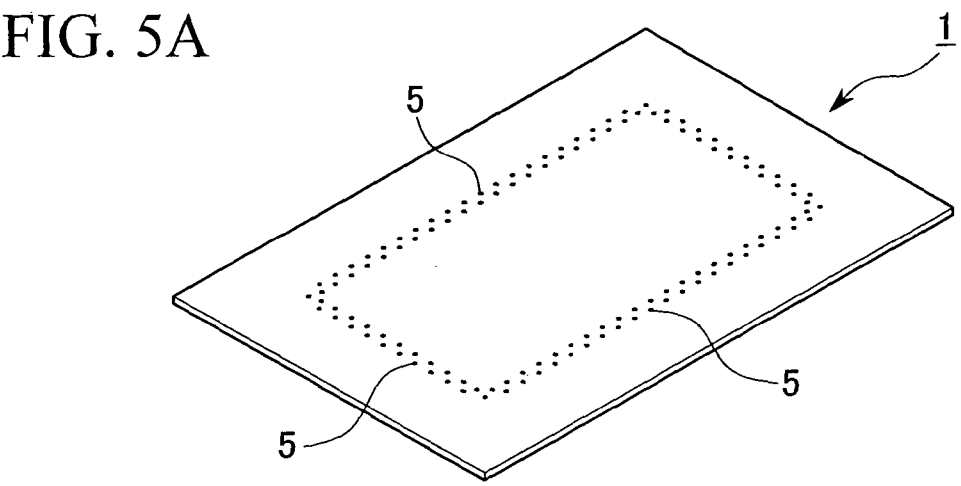
FIG. 5A is a perspective view showing a metal plate panel on which dimples are formed in accordance with a manufacturing method according to a second embodiment of the invention.

Next, a manufacturing method according to a second embodiment of the invention will be described with reference to FIGS. 5A to 5C. Herein, it is possible to use a metal plate panel whose front side can be decorated (or not decorated) by printing, coating and/or the other decorating means, which can be performed in advance or after injection molding. In a first step of the manufacturing method according to the second embodiment, the metal plate panel 1 is subjected to etching to form a plurality of dimples (or small recesses) 5 at prescribed positions in conformity with an outline of a product completed in a manufacture as shown in FIG. 5A. The method for forming the dimples 5 is not necessarily limited to etching; therefore, the dimples 5 can be formed by other methods such as sandblasting. Alternatively, it is possible to form grooves, instead of the dimples, upon cutting and the like.

Figure 5B:
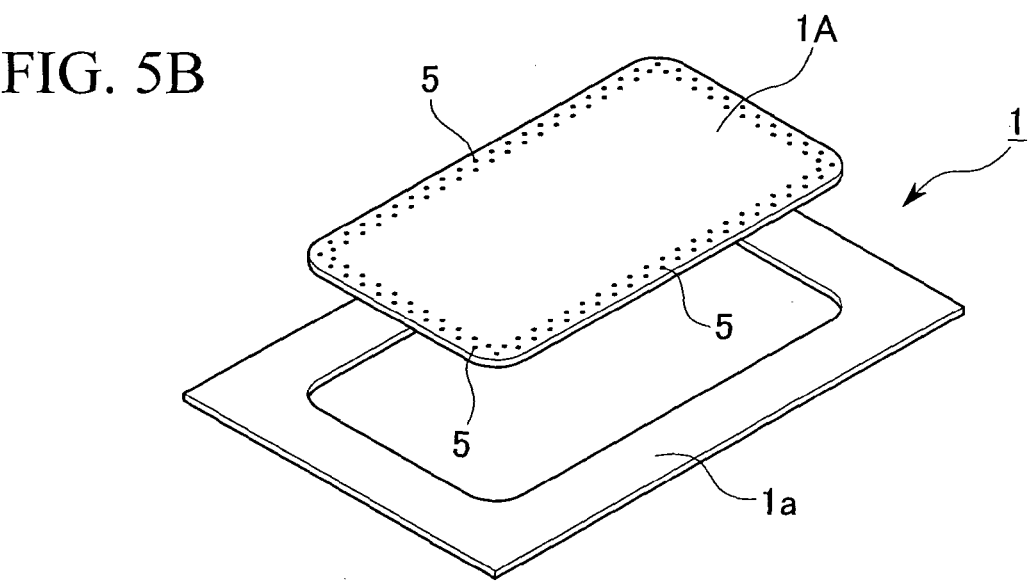
FIG. 5B is a perspective view in which a metal plate is extracted from the rest of the metal plate panel shown in FIG. 5A.
Figure 5C:
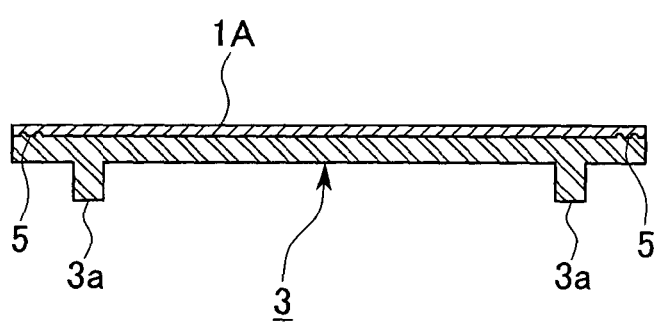
FIG. 5C is a cross sectional view showing a metal design panel in which the metal plate is firmly combined with a resin layer.
Figure 6:
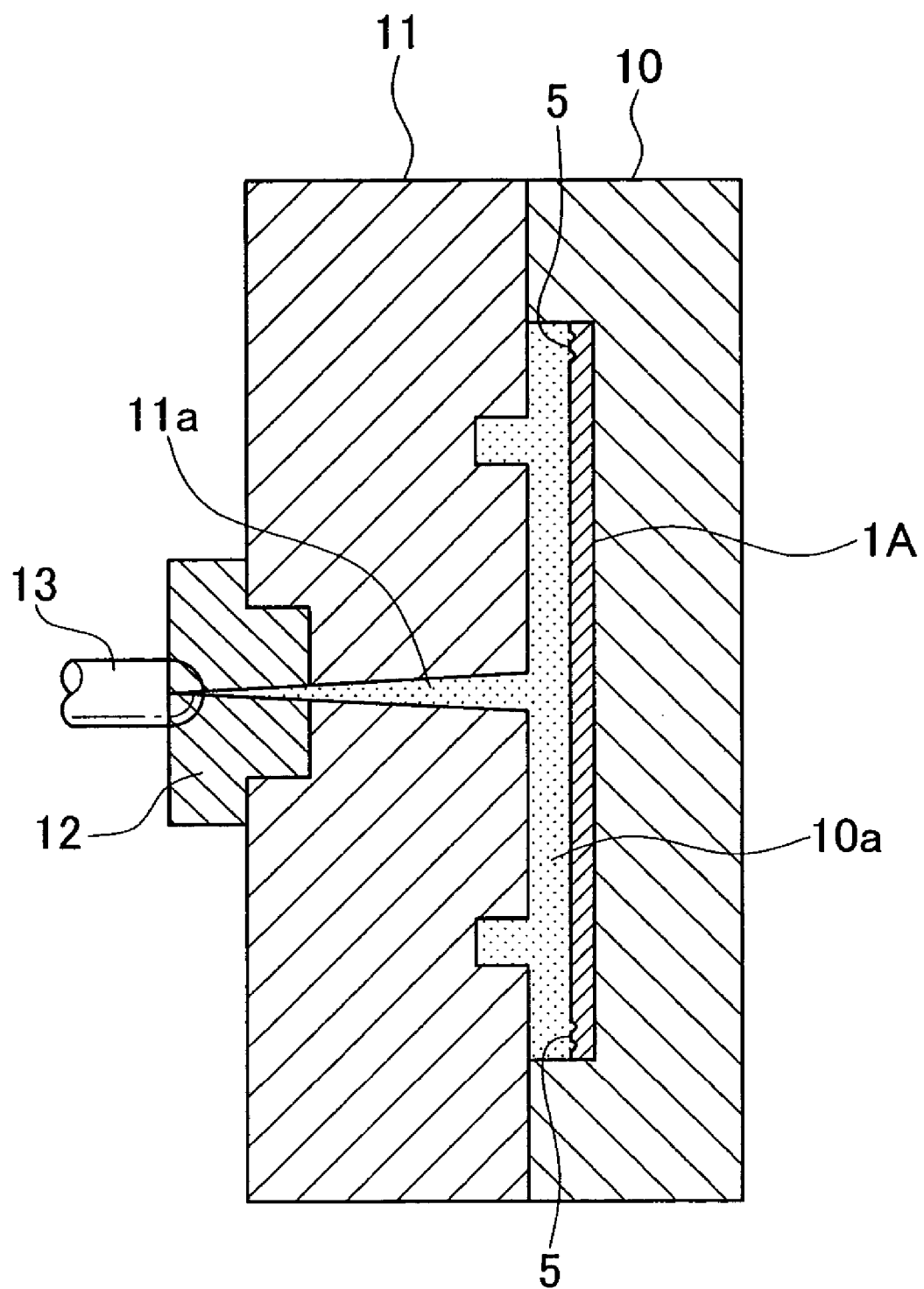
FIG. 6 is a cross sectional view showing a metal mold in which the metal plate shown in FIG. 5B is held and into which a melted resin is injected to form the resin layer.

The metal plate panel 1 of FIG. 5A having the dimples 5 is subjected to trimming so as to remove an unwanted peripheral portion 1a to extract a metal plate 1A as shown in FIG. 5B. The metal plate 1A is arranged in a metal mold for use in injection molding (see FIG. 6) in order to form a resin layer on the backside thereof by use of an injection molding machine. That is, similar to the foregoing first embodiment, a melted resin is injected into the metal mold holding the metal plate 1A.

The melted resin is injected into the metal mold and is then hardened to form a resin layer 3, wherein as shown in FIG. 5, the melted resin is infiltrated into the dimples 5 and is hardened; therefore, it is possible to complete production of a metal design panel in which a surface decorative member is firmly and integrally combined with a resin member. Hence, the surface of the metal design panel can be subjected to baking and printing finish to form prescribed patterns thereon. Thus, it is possible to use the metal design panel as an exterior member, which can be attached to a wall surface or an apparatus by use of legs 3a.

Figure 7A:
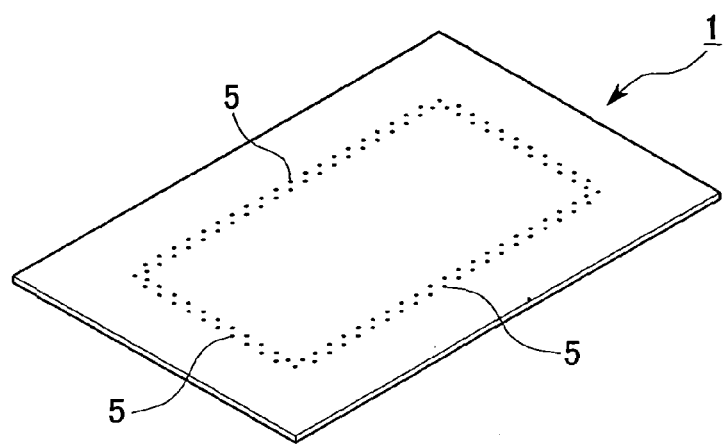
FIG. 7A is a perspective view showing a metal plate panel on which dimples are formed in accordance with a modified manufacturing method according to the second embodiment.
Figure 7B:
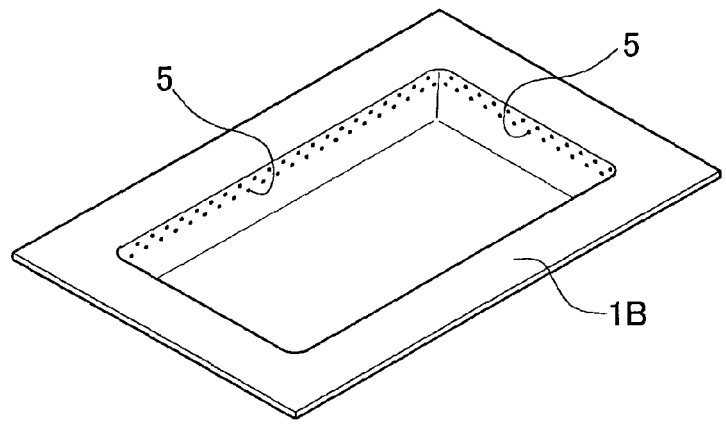
FIG. 7B is a perspective view in which a core member is formed in the metal plate panel shown in FIG. 7A.
Figure 7C:
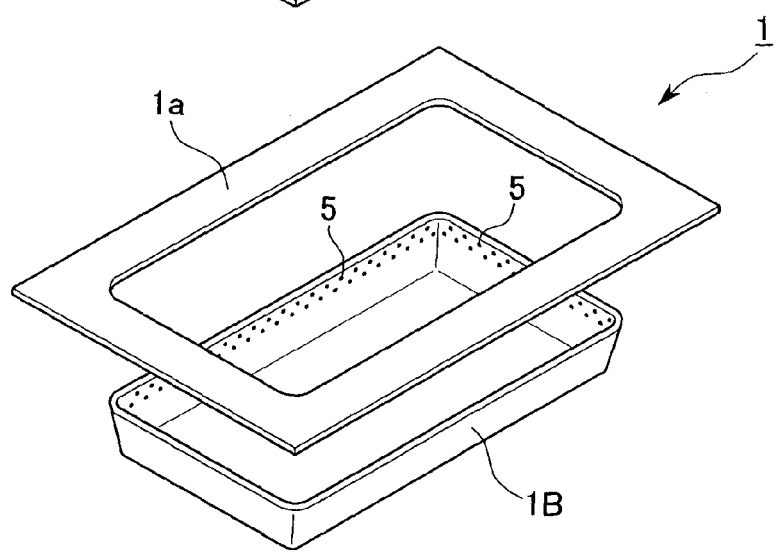
FIG. 7C is a perspective view in which the core member is isolated from the rest of the metal plate panel.

Next, a modified example of the second embodiment will be described with reference to FIGS. 7A to 7D. Herein, it is possible to use a metal plate panel whose front side can be decorated (or not decorated) by printing, coating and/or the other decorating means, which can be performed in advance or after injection molding. In a first step, appropriate processing such as mechanical machining (e.g., shotblasting and sandblasting) and chemical treatment (e.g., etching) is performed on the metal plate panel 1 so as to form a plurality of dimples (or small recesses) 5 at prescribed positions in conformity with an outline of a product completed in a manufacture as shown in FIG. 7A. Then, the metal plate panel 1 of FIG. 7A is subjected to press working to form a core member 1B, which is built up from the dimples 5. At this time, it is possible to simultaneously form irregular patterns (or irregularities) on the surface of the core member 1B. After the formation of the core member 1B, the metal plate panel 1 is subjected to trimming so as to remove an unwanted peripheral portion 1a as shown in FIG. 7C. In the modified manufacturing method described above, the metal plate panel 1 is molded and is then subjected to trimming to remove the unwanted peripheral portion 1a; however, it is possible to change the order of these steps. That is, the metal plate panel 1 can be first subjected to trimming to remove the unwanted peripheral portion 1a, and then, be molded to form the core member 1B.

Figure 7D:
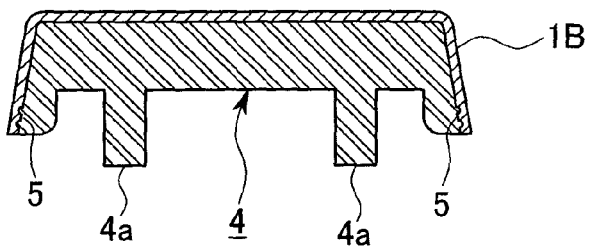
FIG. 7D is a cross sectional view showing a metal design panel in which the core member is firmly combined with a resin layer.

The aforementioned core member 1B derived from the metal plate panel 1 is arranged in a metal mold for use in injection molding (see FIG. 8) in order to form a resin layer on the backside thereof by use of an injection molding machine. That is, similar to the foregoing first embodiment, a melted resin is injected into the metal mold holding the core member 1B and is then hardened to form a resin layer 4 as shown in FIG. 7D. In this case, the melted resin is infiltrated into the dimples 5 and is then hardened; therefor, it is possible to produce a metal design panel in which a surface decorative member is firmly and integrally combined with a resin member. This metal design panel can be attached to a wall surface or an apparatus by use of legs 4a.

Next, improvements of adhesion (or grip performance between the metal and resin) adapted to a metal design panel produced by the first embodiment will be described with reference to FIGS. 9A to 9C, each of which is an enlarged cross sectional view showing essential parts of the metal design panel. FIG. 9A shows that a part of the resin layer 4 enters into each of the through holes 2, each having the same diameter, which are formed on the metal plate panel 1. FIG. 9B shows that undercutting is performed on the opening of the through hole 2 so as to improve grip performance for gripping the resin layer 4 by the metal plate panel 1. FIG. 9C shows that a melted resin flowing into the through hole 2 of the metal plate panel 1 is changed in direction to flow along the surface of the metal plate panel 1 and is then hardened. This also improves grip performance for gripping the resin layer 4 by the metal plate panel 1.

Figure 10A:
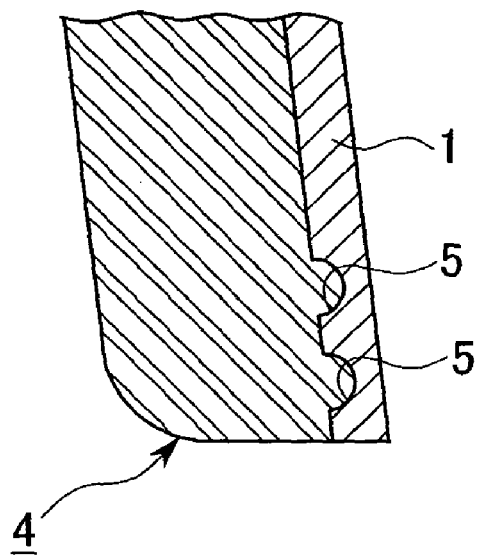
FIG. 10A is an enlarged cross sectional view showing essential parts of a metal design panel, produced by the second embodiment, in which a resin layer partially enters into dimples formed on a metal plate panel.
Figure 10B:
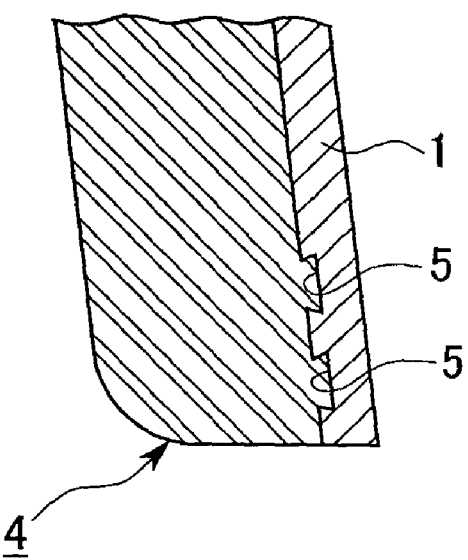
FIG. 10B is an enlarged cross sectional view showing essential parts of the metal design panel in which a resin layer partially enters into grooves, which are subjected to undercutting.

Next, improvements of grip performance in a metal design panel produced by the second embodiment will be described with reference to FIGS. 10A and 10B, each of which is an enlarged cross sectional view showing essential parts of the metal design panel. FIG. 10A shows that a resin layer 4 partially enters into dimples 5 formed on the metal plate panel 1. FIG. 10B shows that a resin layer 4 partially enters into grooves, which are subjected to undercutting.

Figure 11A:
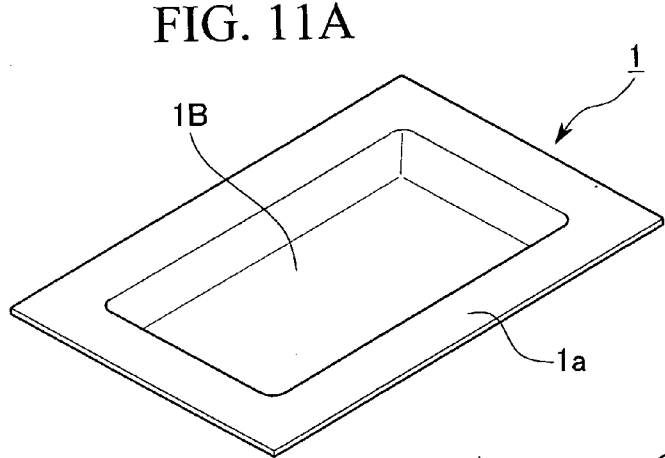
FIG. 11A is a perspective view showing a metal plate panel in which a core member is formed in accordance with a manufacturing method according to a third embodiment of the invention.
Figure 11B:
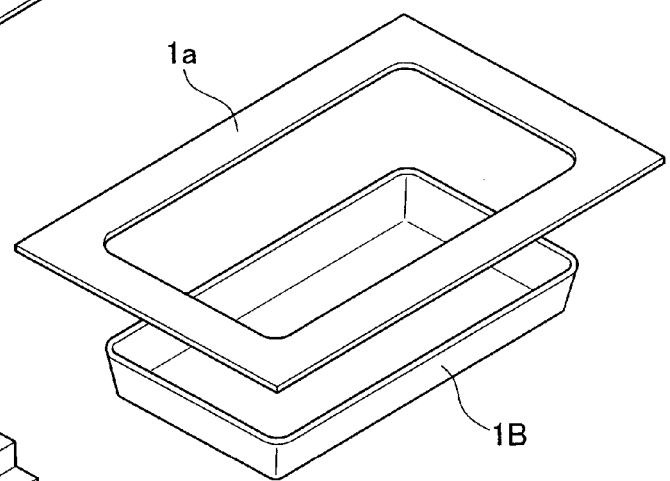
FIG. 11B is a perspective view in which the core member is isolated from the rest of the metal plate panel.

Next, a manufacturing method of a metal design panel according to a third embodiment of the invention will be described with reference to FIGS. 11A to 11D. Herein, it is possible to use a metal plate panel whose front side can be decorated (or not decorated) by printing, coating and/or the other decorating means, which can be performed in advance or after injection molding. In a first step, the metal plate panel 1 is subjected to press machining and is adequately molded as shown in FIG. 11A, wherein a core member 1B is formed in the metal plate panel 1. Then, the metal plate panel 1 having the core member 1B is subjected to trimming to remove an unwanted peripheral portion 1a derived from walls of the core member 1B as shown in FIG. 11B. Therefore, it is possible to isolate the core member 1B that serves as a surface decorative member.

Figure 11C:
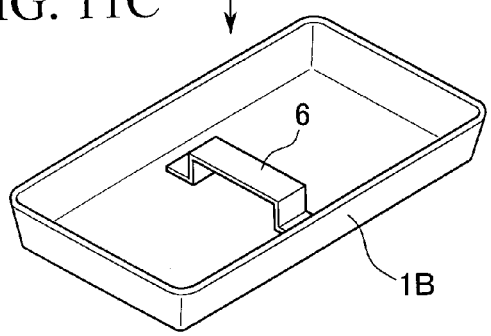
FIG. 11C is a perspective view in which a holding member is fixed to the core member.
Figure 11D:
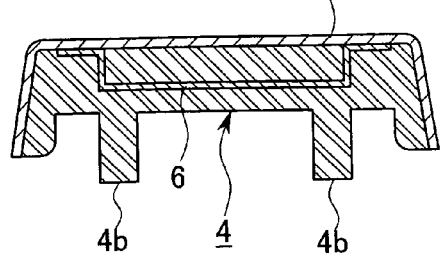
FIG. 11D is a cross sectional view showing a metal design panel in which a resin is integrally combined with the core member having the holding member.

A holding member 6 is fixed to the core member 6 by adhesion or welding as shown in FIG. 11C. Then, similar to the foregoing first and second embodiments, an injection molding machine is used to inject a melted resin into a metal mold in which the core member 1B having the holding member 6 is arranged, wherein the melted resin is hardened to form a resin layer 4 encapsulating the holding member 6; thus, it is possible to complete production of a metal design panel as shown in FIG. 11D. The third embodiment is characterized in that both the resin layer and the holding member 6 are integrally combined together; therefore, it is possible to increase the strength for combining the resin layer 4 with the core member 1B having the holding member 6.

Figure 12A:
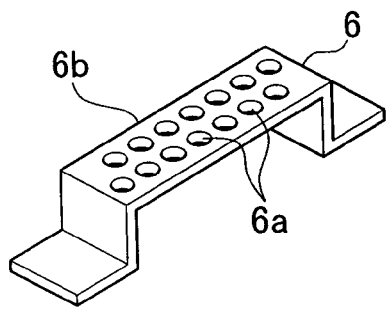
FIG. 12A is a perspective view showing an example of a holding member having through holes.
Figure 12B:
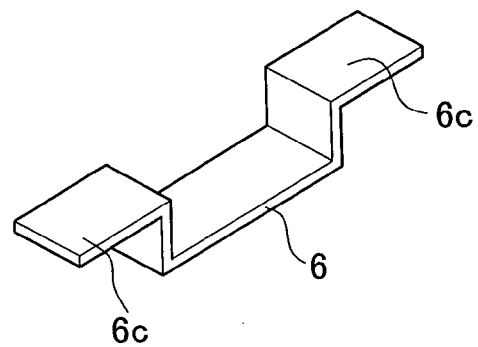
FIG. 12B is a perspective view showing an example of a holding member having wing-like ends.
Figure 12C:
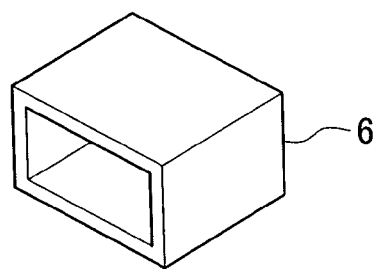
FIG. 12C is a perspective view showing an example of a holding member having a rectangular pole like shape whose inside is hollow.
Figure 12D:
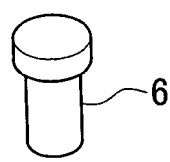
FIG. 12D is a perspective view showing a bolt whose head corresponds to a holding member.
Figure 12E:
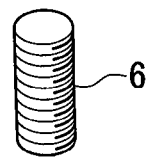
FIG. 12E is a perspective view showing a holding member having a cylindrical shape whose exterior circumferential surface is internally grooved.

Incidentally, it is possible to form through holes 6a penetrating through a holding portion 6b of the holding member 6 (see FIG. 12A), whereby an injected resin certainly enters into the through holes 6a to further increase the strength for combining the resin layer 4 with the core member 1B having the holding member 6. The holding member 6 is not necessarily limited to a prescribed shape shown in FIG. 12A; hence, it is possible to adequately modify the shape of the holding member 6 as shown in FIGS. 12B to 12E. That is, FIG. 12B shows a holding member 6 having wing-like ends 6c, and FIG. 12C shows a holding member 6 having a rectangular pole like shape whose inside (or core) is hollow. FIG. 12D shows a bolt whose head corresponds to a holding member, and FIG. 12E shows a holding member having a cylindrical shape whose exterior circumferential surface is internally threaded or grooved. Thus, one holding member 6 or plural holding members 6 are fixed to the core member 1B.

Figure 13A:
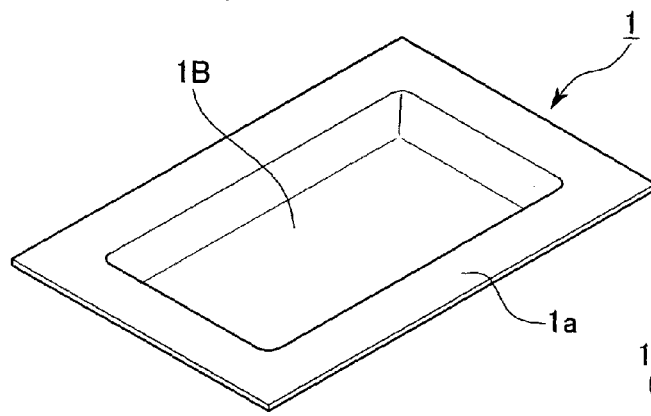
FIG. 13A is a perspective view showing a metal plate panel in which a core member is formed in accordance with a manufacturing method according to a fourth embodiment of the invention.
Figure 13B:
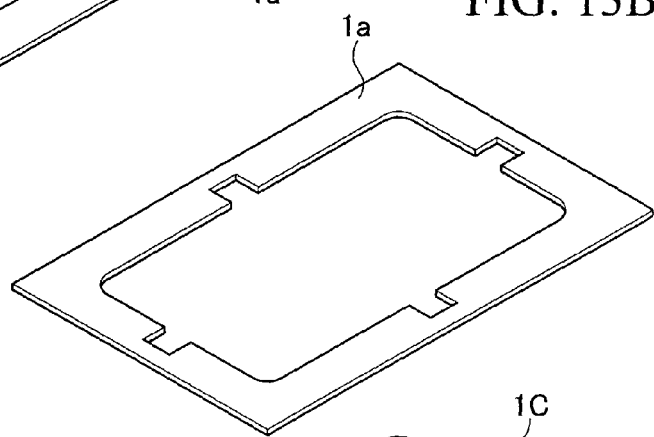
FIG. 13B is a perspective view in which the core member is isolated from the rest of the metal plate panel.
Figure 13C:
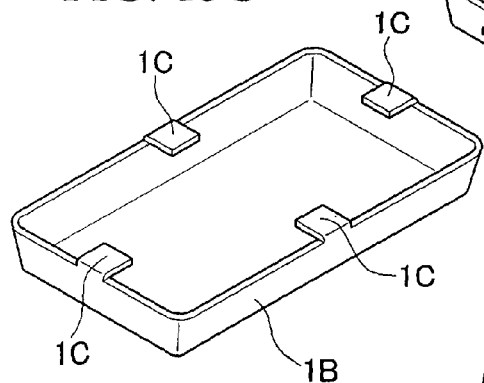
FIG. 13C is a perspective view showing the core member having projecting elements, which are inwardly bent.

Next, a manufacturing method of a metal design panel according to a fourth embodiment of the invention will be described with reference to FIGS. 13A to 13D. Herein, it is possible to use a metal plate panel whose front side can be decorated (or not decorated) by printing, coating and/or the other decorating means, which can be performed in advance or after injection molding. In a first step, a metal plate panel 1 is installed in a press working machine (not shown), wherein it is subjected to molding as shown in FIG. 13A. Then, the metal plate panel 1 is subjected to trimming to remove an unwanted peripheral portion 1a, which is built up from a core member 1B as shown in FIG. 13B, wherein projecting elements 1C are formed to remain on four sides of rectangular peripheral ends of the core member 1B. Then, the projecting elements 1C are inwardly bent as shown in FIG. 13C, thus completely forming the core member 1B having the four projecting elements 1C.

Figure 13D:
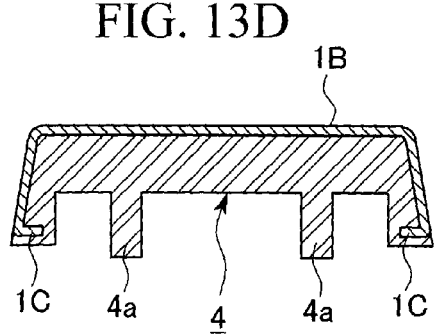
FIG. 13D is a cross sectional view showing a metal design panel in which a resin is firmly combined with the core member having the projecting elements.
Figure 14:
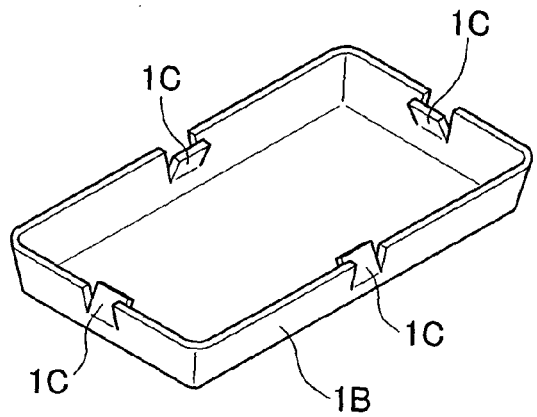
FIG. 14 is a perspective view showing an example of a core member in which projecting elements are bent inwardly.
Figure 15A:
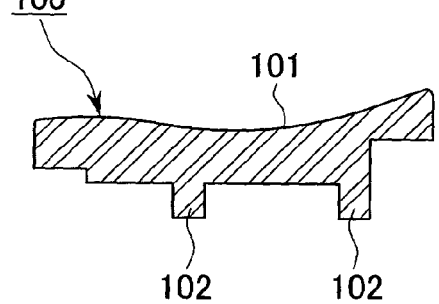
FIG. 15A diagrammatically shows a solid member made of a thermoplastic resin that is prepared in accordance with a first step of a conventionally-known manufacturing method.
Figure 15B:
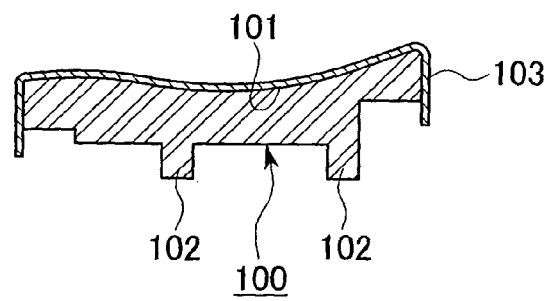
FIG. 15B diagrammatically shows a second step of the conventionally-known manufacturing method in which a metal plate panel is arranged on the surface of the solid member by an adhesive.
Figure 15C:
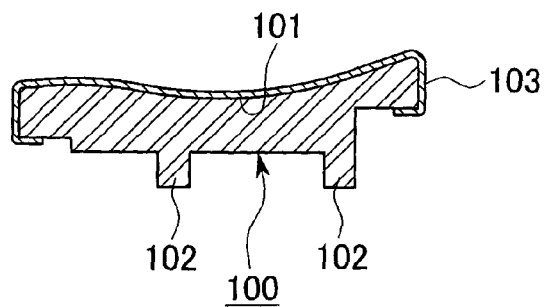
FIG. 15C diagrammatically shows a third step of the conventionally-known manufacturing method in which ends of the metal plate member are bent to cover both ends of the solid member.

Similar to the foregoing embodiments, an injection molding machine is used to inject a melted resin into the hollow of the core member 1B; thus, it is possible to produce a metal design panel shown in FIG. 13D in which the projecting elements 1C are embedded in a resin layer. The fourth embodiment is characterized in that the core member 1B is designed to have the projecting elements 1C; therefore, it is possible to further increase the strength for combining the core member 1B with the resin layer. FIG. 14 shows another example of the core member 1B in which projecting elements 1C are formed by partially cutting side walls of the core member 1B and are then inwardly bent. Herein, it is possible to further increase the strength for combining the core member 1B having the projecting elements 1C with the resin layer.

As described heretofore, this invention has a variety of effects and technical features, which will be described below.

(1) A metal design panel is constituted by a surface decorative member (made of a prescribed metal) and a thermoplastic resin, which are firmly and integrally combined together. Therefore, even when the metal design panel is placed in severe environmental conditions having relatively large temperature changes, it is possible not to deteriorate the quality thereof, thereby avoiding problems.

(2) First, through holes are formed at prescribed positions of a metal plate panel (serving as the surface decorative member) in conformity with an outline of a product completed in a manufacture; then, the metal plate panel is subjected to trimming to remove an unwanted peripheral portion, thus extracting a metal plate having the through holes. The metal plate is arranged in a metal mold for use in injection molding, into which a melted thermoplastic resin is injected and is then hardened to integrally form a resin member.

(3) Second, dimples (or small recesses) are formed at prescribed positions of a metal plate panel in conformity with an outline of a product completed in a manufacture, wherein the metal plate panel is subjected to trimming to remove an unwanted peripheral portion, thus extracting a metal plate having the dimples. The metal plate is arranged in a metal mold for use in injection molding, into which a melted thermoplastic resin is injected and is then hardened to integrally form a resin member.

(4) Third, a metal plate member is subjected to molding and trimming to form a core member; then, a holding member is fixed to the interior wall of the core member by adhesion or welding; thereafter, a thermoplastic resin is injected into the core member so as to integrally form a resin layer.

(5) Fourth, the core member can be designed to have projecting elements, which are inwardly bent, thus further increasing the combining strength when combined with the resin layer.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A manufacturing method for a metal design panel comprising:
    forming a plurality of through holes at prescribed positions of a metal plate panel, which serves as a surface decorative member, the prescribed positions being continuous around a periphery of a product completed in manufacture;
    trimming the metal plate panel to remove a peripheral portion, thus extracting a metal plate having the plurality of through holes continuous around the periphery of the metal plate; and
    injecting a thermoplastic resin into a metal mold in which the metal plate is arranged, thus forming a resin layer firmly combined with the metal plate.

2. The manufacturing method for a metal design panel according to claim 1, wherein the metal plate extracted from the metal plate panel is subjected to molding.

3. A manufacturing method for a metal design panel comprising:
    forming a plurality of dimples at prescribed positions of a metal plate panel, which serves as a surface decorative member, the prescribed positions being continuous around a periphery of a product completed in manufacture;
    trimming the metal plate panel to remove a peripheral portion, thus extracting a metal plate having the plurality of dimples continuous around the periphery of the metal plate; and
    injecting a thermoplastic resin into a metal mold in which the metal plate is arranged, thus forming a resin layer firmly combined with the metal plate.

4. The manufacturing method for a metal design panel according to claim 3, wherein the metal plate extracted from the metal plate panel is subjected to molding.

5. A manufacturing method for a metal design panel comprising the steps of:
    molding and trimming a metal plate panel, which serves as a surface decorative member, to form a core member, which is then cut out from the metal plate panel;
    fixing a holding member onto an interior wall of the core member by adhesion or by welding; and
    injecting a thermoplastic resin into an interior space of the core member, thus encapsulating the holding member in a resin layer, which is firmly combined with the core member.

6. The manufacturing method for a metal design panel according to claim 5, wherein a plurality of through holes on the holding member.

7. A manufacturing method for a metal design panel comprising the steps of:
    molding and trimming a metal plate panel, which serves as a surface decorative member, to form a core member, which is then cut out from the metal plate panel and which is integrally accompanied with a plurality of projecting elements;
    inwardly bending the plurality of projecting elements relative to the core member; and
    injecting a thermoplastic resin into an interior space of the core member, thus embedding the projecting elements in a resin layer, which is firmly combined with the core member.

* * * * *